United States Patent
Doumi et al.

(10) Patent No.: US 9,408,065 B2
(45) Date of Patent: Aug. 2, 2016

(54) CONTROLLING WIRELESS COMMUNICATIONS ON BEHALF OF PUBLIC SERVICE AGENCIES

(71) Applicant: ALCATEL-LUCENT, Paris (FR)

(72) Inventors: Tewfik Doumi, Edison, NJ (US); Hanan M. Novotny, Aberdeen, NJ (US); Anish Sankalia, Iselin, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/551,372

(22) Filed: Nov. 24, 2014

(65) Prior Publication Data
US 2015/0148026 A1    May 28, 2015

Related U.S. Application Data

(63) Continuation of application No. 11/611,903, filed on Dec. 18, 2006, now abandoned.

(51) Int. Cl.
| | |
|---|---|
| *H04W 8/20* | (2009.01) |
| *H04L 12/66* | (2006.01) |
| *H04W 88/18* | (2009.01) |
| *H04W 4/06* | (2009.01) |

(52) U.S. Cl.
CPC ............ *H04W 8/20* (2013.01); *H04L 12/66* (2013.01); *H04W 88/18* (2013.01); *H04W 4/06* (2013.01); *H04W 88/182* (2013.01)

(58) Field of Classification Search
CPC ........ H04L 12/66; H04W 4/06; H04W 88/18; H04W 88/182; H04W 8/20
See application file for complete search history.

(56) References Cited

U.S. PATENT DOCUMENTS

| | | | | |
|---|---|---|---|---|
| 5,990,886 A | * | 11/1999 | Serdy ................... | G06Q 10/107 707/999.004 |
| 6,892,233 B1 | * | 5/2005 | Christian ............ | H04L 41/0813 709/221 |
| 6,959,436 B2 | * | 10/2005 | Peng ...................... | H04L 29/06 719/310 |
| 2003/0043765 A1 | * | 3/2003 | Dawidowsky ........ | H04W 48/20 370/331 |
| 2003/0088569 A1 | * | 5/2003 | Rubert ................ | G06F 21/6218 |
| 2004/0110515 A1 | * | 6/2004 | Blumberg .............. | G01C 21/20 455/456.1 |
| 2007/0226225 A1 | * | 9/2007 | Yiu ...................... | H04L 12/1818 |

OTHER PUBLICATIONS

Informed. BlackBerry for Public Safety Organizations, Research in Motion, 2004 http://www.blackberry.com/solutions/pdfs/Government/BlackBerry_Public_Safety_hi-res.pdf.

* cited by examiner

*Primary Examiner* — Kashif Siddiqui
(74) *Attorney, Agent, or Firm* — Carlson, Gaskey & Olds, P.C.

(57) ABSTRACT

A device (34) facilitates communications on behalf of users from various public service agencies (22-32). An example device (34) is implemented at a core layer such that it is capable of interfacing with a plurality of wireless communication network elements. An example device (34) includes a database portion (36) that includes information regarding how wireless communications should be managed on behalf of individuals associated with one or more public service agencies. A communication portion (38) interfaces with one or more network elements to provide information from the database portion (36) to achieve the desired control over wireless communications on behalf of end users from the public service agencies. Control portions (40) provide information and management capabilities to agencies utilizing the device (34).

22 Claims, 2 Drawing Sheets

CONTROLLING WIRELESS COMMUNICATIONS ON BEHALF OF PUBLIC SERVICE AGENCIES

CROSS-REFERENCE TO RELATED APPLICATIONS

This application is a continuation of U.S. patent application Ser. No. 11/611,903, which was filed on Dec. 18, 2006.

TECHNICAL FIELD

This invention generally relates to communication. More particularly, this invention relates to wireless communications by members of public service agencies.

DESCRIPTION OF THE RELATED ART

Wireless communication systems are well known. Geographic regions are divided into so-called cells that are serviced by base station transceiver devices. An individual mobile station within a cell communicates over a radio interface with the base station transceiver device. A wireless communication network operates in a known manner to communicate with the base station transceiver device for facilitating communication between the mobile station and another device such as a line-based telephone or another mobile station.

Such communication arrangements are useful for a variety of purposes. The general public uses such wireless communication systems for voice, data, internet or other types of communications as known. It would be useful to provide wireless communication capabilities for public service agencies that exploits the abilities of known wireless communication systems but provides special features. It may be desirable to have special features for facilitating communications on behalf of such users that are different from the features provided to the general public.

It is not economically feasible for each public service agency desiring such communication abilities to maintain their own wireless communication network. It would be beneficial if public service agencies could utilize the capabilities provided by existing, dedicated public service wireless communication networks but customize the control of wireless communications for members of such agencies. This invention provides an arrangement that allows public service agencies to control wireless communications by individuals working for such agencies.

SUMMARY OF THE INVENTION

An exemplary device for facilitating wireless communications on behalf of at least one public service agency includes a database portion that has information regarding how at least one wireless communication network element is to operate on behalf of a user from the public service agency. A communication portion is configured to interface with the wireless communication network element to provide information from the database portion to that network element for controlling wireless communications by the user according to the provided information. A control portion is configured to allow the public service agency to configure information in the database portion corresponding to the users from that public service agency.

An exemplary method of facilitating wireless communications on behalf of a public service agency involves including information in a database regarding how at least one wireless communication network element is to operate on behalf of a user from that public service agency. The public service agency is allowed to configure information in the database corresponding to users from that public service agency. The exemplary method includes communicating with at least one wireless communication network element to provide information from the database to that element for controlling wireless communications by the user according to the provided information.

The various features and advantages of this invention will become apparent to those skilled in the art from the following detailed description. The drawings that accompany the detailed description can be briefly described as follows.

DETAILED DESCRIPTION

Disclosed example arrangements allow for customizing how wireless communications are conducted on behalf of a public service agency such as a police department, a fire department, an emergency medical service provider, a road commission or a department of public works, for example. A unique approach is disclosed that allows each such agency to customize how wireless communications are controlled on behalf of individuals associated with that agency.

Figure 1:
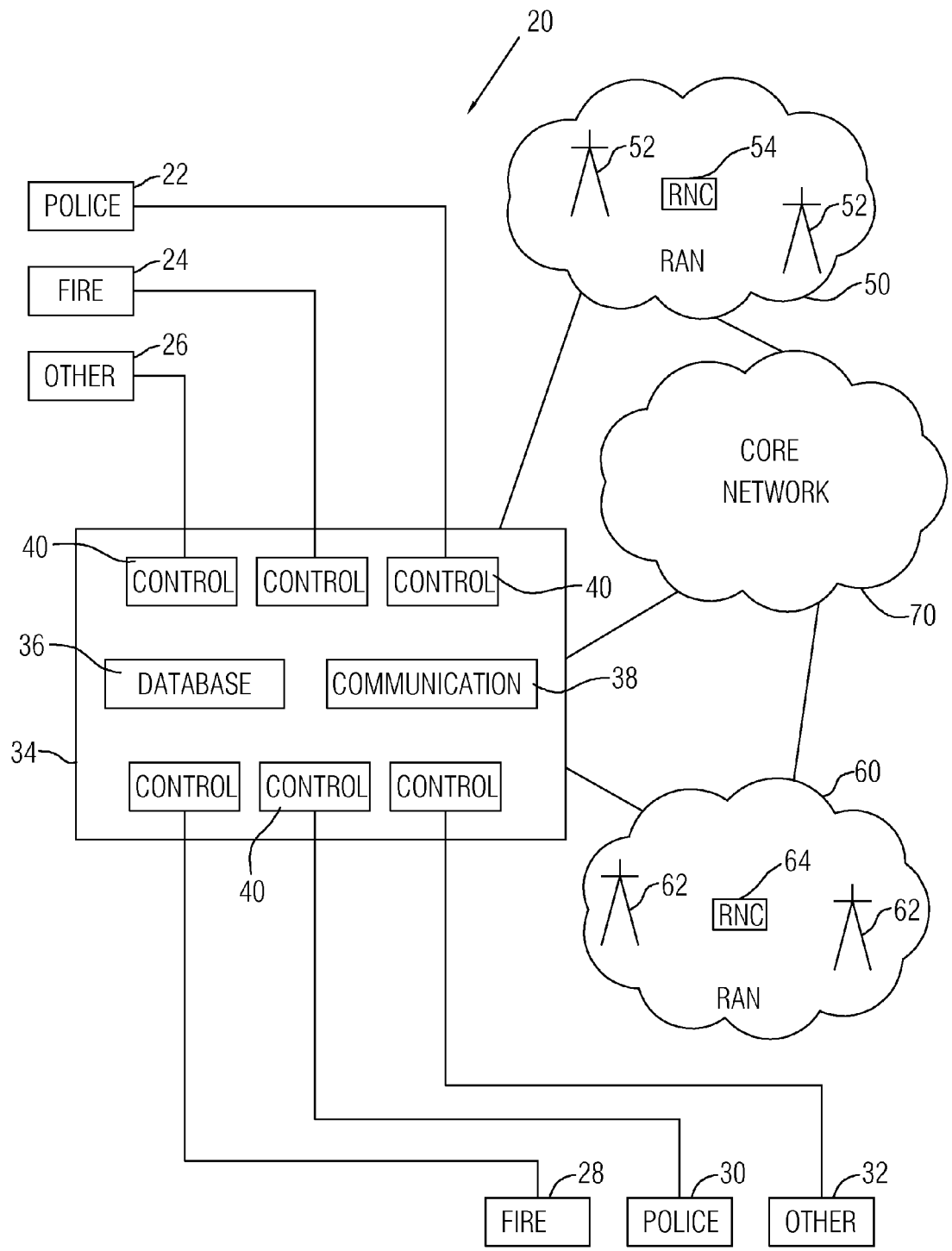
FIG. 1 schematically illustrates selected portions of a wireless communication system that is useful with an embodiment of this invention.

FIG. 1 schematically shows selected portions of a wireless communication system 20. A plurality of public service agencies 22, 24, 26, 28, 30 and 32 each employ a plurality of individuals for performing various jobs required for each such agency. Such individuals are provided with mobile station communication equipment (not illustrated) that allows them to conduct wireless communications utilizing technologies that are known for existing wireless communication networks.

The illustrated example includes a device 34 for facilitating wireless communications on behalf of the public service agencies 22-32. The example device 34 includes a database portion 36 that includes information regarding how a wireless communication network element should operate on behalf of a user from the corresponding one of the public service agencies so that a desired type of wireless communication service is provided to such an individual.

The example device 34 also includes a communication portion 38 that interfaces with at least one wireless communication network element to provide information from the database portion 36 to an appropriate wireless communication network element for controlling wireless communications by the individual according to the provided information.

The illustrated device 34 includes a plurality of control portions 40 that allow the respective public service agencies 22-32 to configure information in the database portion corresponding to the users from their respective agencies and to manage or monitor wireless communications of their employees.

The device 34 may comprise hardware, software, firmware or a combination of these. Those skilled in the art who have the benefit of this description will realize how to configure a database portion 36, communication portion 38 and control portions 40 to meet the needs of their particular situation. For discussion purposes, the database portion 36, communication portion 38 and control portions 40 are schematically illustrated together. However, each of these portions may be geographically located remote from each other. For example, each control portion 40 may be incorporated into equipment (e.g., a computer) located at a facility for each agency, be in a central location or a combination of these. Similarly, the database portion may be maintained at a central location or be geographically disbursed among various remote locations. Given this description, those skilled in the art will realize how to configure a device 34 to meet their particular needs.

The example device 34 provides the ability to facilitate specific mandatory features and services for a wide area public service network based on existing and emerging wide area broadband wireless technologies such as CDMA2000, WCDMA and 802.xx technologies, for example. In the illustrated example, the device 34 is a stand alone solution interfacing with multiple components or elements in a wireless communication network, internet protocol core domain elements for wide area broadband wireless technology, or both, to provide external control functions, restrict public service agency users to access specific applications from specific sources (e.g., jurisdictions) and to provide each jurisdiction or public service agency with control over its own end user subscribers. Additionally, the illustrated example provides additional options that allows for realizing full public safety features as available in known narrow band voice and low speed data networks. In other words, an agency using the illustrated example would not have to sacrifice any of the features available from their current land mobile radio system and would have a similar amount of control over its use.

In one example, the database portion 36 comprises a software algorithm and database engine solution that resides on known hardware such as a database server, blade server, mainframe computer or a personal computer arrangement running standardized database operating systems. In the illustrated example, the device 34 is located at an Internet Protocol (IP) core network layer and interfaces with all necessary elements within a wide area broadband wireless network using internet protocol connectivity over standard transport technologies such as Ethernet, Gigabit Ethernet or native IP.

In one example, a hierarchy of end-to-end operation includes a wide area broadband wireless solution with a device 34 at a core level collating all the information from core network elements, radio access network elements, firewalls, border gateways, service gateways and application servers and end user devices. The device 34 distributes the collated information in a graphic user interface format in one example to the control devices 40 so that the information is useful to an appropriate individual at a corresponding one of the agencies 22-32. In one example, the control portions 40 trigger read and write commands responsive to input from an individual to trigger corresponding read and write commands to appropriate network elements for controlling wireless communications by an individual or an entire agency at any time on an as-needed basis.

In the illustrated example, the device 34 communicates through the communication portion 38 with one or more elements of a radio access network (RAN) 50. Example elements of the RAN 50 include base station transceivers 52 and a radio network controller 54. In the illustrated example, the RAN 50 is owned or managed by the jurisdiction or geographic region that includes the public service agencies 22, 24 and 26. In this example, the public service agency 22 is a police department, the agency 24 is a fire department and the agency 26 is another department such as an emergency medical service response team, a department of public works or a road commission, for example.

The communication portion 38 of the device 34 also interfaces with one or more elements of a RAN 60 that includes, for example, base station transceiver devices 62 and a radio network controller 64. In this example, the RAN 60 is owned, operated or managed by the jurisdiction or geographic region that includes the public service agencies 28, 30 and 32.

A core network 70 includes known elements or components to facilitate wireless communications in a known manner. The core network 70 interfaces with the RANs 50 and 60 in a known manner. The communication portion 38 interfaces with one or more elements of the core network 70 in the illustrated example.

The database portion 36 includes information regarding how wireless communications should be conducted on behalf of various users of the various public service agencies. Example database information includes subscriber identification or definition, end user device MAC address, unique IP address as assigned by wide area broadband wireless networks, subscriber identity as assigned by a wide area broadband wireless network, subscriber MSISDN or E.164 number or ENUM number as assigned by a network, its current cell or sector ID location, its quality of service policy, its profile including priority, unique ID as assigned by a public service agency, its CAC card details or REALID details and its security level. Additionally, other required fields particular to a given agency may be included.

For example, the database portion 36 includes information regarding a user ID, a level of access provided to that individual, a quality of service required for that individual, any limitations on wireless communications by that individual and a real time profile regarding use of wireless communications by that individual. The example database portion 36 may include other information to establish a profile for each user of each agency to meet the needs of a particular situation. The device 34 allows for public service agencies to have a relatively simple way of controlling, modifying, assigning priority, allowing network and application access or denying network and application access that takes into account a variety of criteria as may be mandated by the policies of a particular agency.

The device 34 allows for wireless communications by individuals associated with such agencies that satisfies the requirements of communications currently used in narrowband wireless solutions for such agencies. For example, the device 34 allows a police department 22 to control wireless communications on behalf of police officers that satisfies policies and regulations regarding how police officers currently use police radios. At the same time, the device 34 allows for providing a wider range of wireless communication possibilities to such police officers. The device 34 also allows authorized individuals from the police department 22 to customize how wireless communications on behalf of its police officers should be conducted by the system 20.

In the illustrated example, the communication portion 38 interfaces with one or more elements of an appropriate one of the RAN 50, RAN 60, Core Network 70 or a combination of these. The communication portion 38 provides information from the database portion 36 to appropriate elements of the wireless communication networks so that those elements will function in a manner that is consistent with the agency's desired level or type of wireless communication to be provided to a particular individual of that agency. For example, the database portion 36 may include information regarding the quality of service to be provided to a particular individual. The communication portion 38 provides that information to an appropriate one of the network elements that will monitor appropriate criteria of ongoing wireless communications for that individual to ensure that the desired level of quality of service is obtained or maintained.

Figure 2:
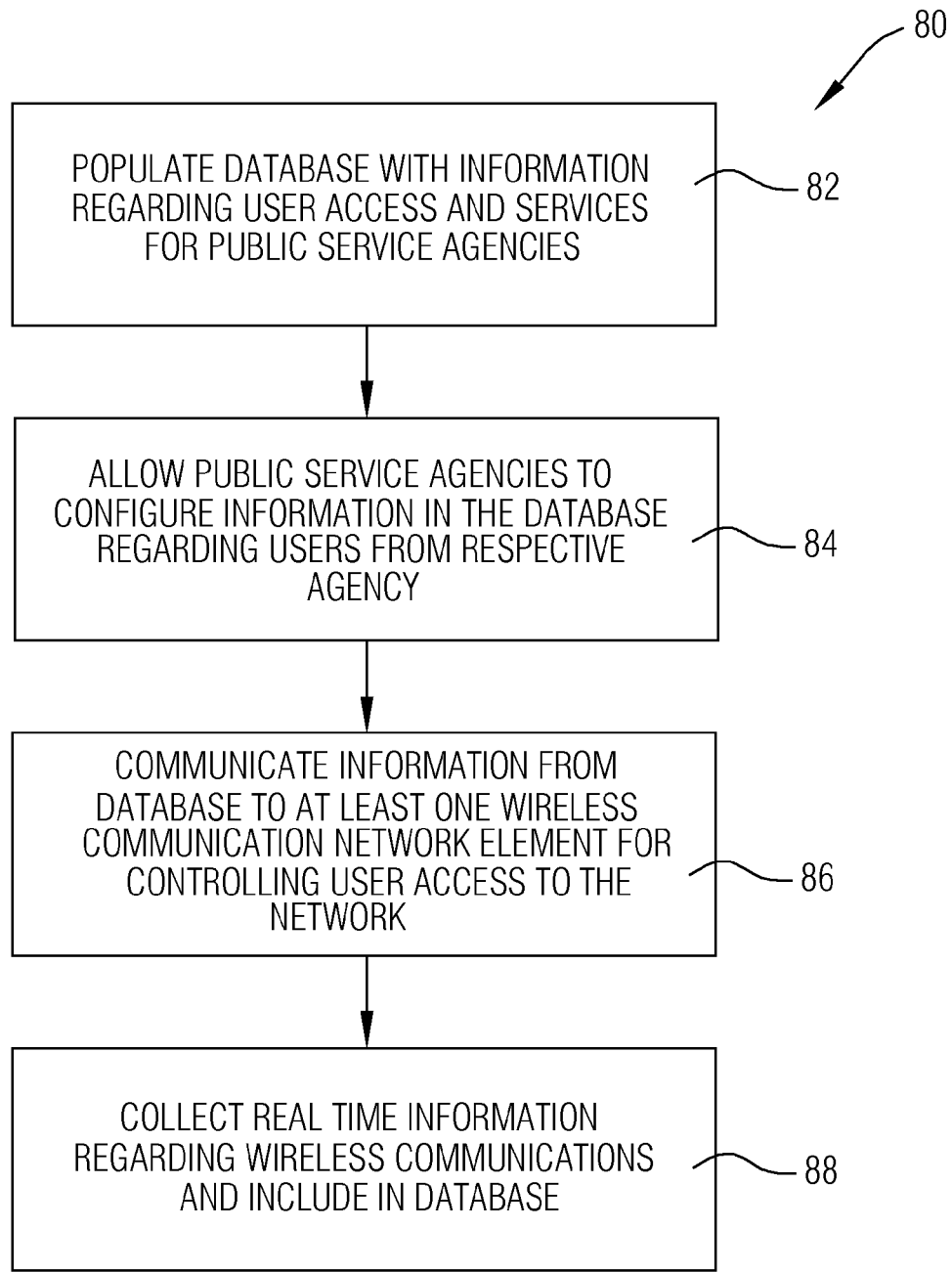
FIG. 2 is a flowchart diagram summarizing one example approach.

FIG. 2 includes a flowchart diagram 80 that summarizes one example approach. At 82, the database portion 36 is populated with information regarding user access and services for the various public service agencies that are entitled to use of the device 34. At 84, the various agencies are allowed to configure information in the database portion 36 regarding users from their respective agency. At 86, the communication portion 38 communicates information from the database portion 36 to at least one wireless communication network element for controlling user access to the network. At 88, real time information is collected regarding wireless communications conducted by individuals associated with one or more of the agencies 22-32. Such real time information is included in the database portion 36, reported to a corresponding control portion 40 or both.

In one example, the communication portion 38 has READ, WRITE and MODIFY rights to each network element that runs proprietary or open operating software to achieve a desired operation responsive to corresponding information from the database portion 36. In one example, the communication portion 38 has such rights for interfacing with one or more network elements from either of the RANs 50 or 60, the Core Network 70 and any jurisdiction-specific VPN gateways.

For example, the communication portion 38 may interface with one or more elements from one of the RANs 50 or 60. Example types of control functions that may be implemented by interfacing with a RAN element include controlling handovers between base station transceivers according to the profile of a particular subscriber. Another control function includes controlling handovers between sectors controlled by the same base station on a per-subscriber basis. Data rate and global positioning system controls are also possible.

Other example control features at a RAN level include handover control within a radio area network or between radio area networks. Other example controls include radio frequency coverage control at jurisdiction boundaries for crossover or radio frequency layer purposes.

Example controls handled by the example communication portion 38 when interfacing with a core network element include controlling gateway handover, whether on an inter-gateway or intra-gateway basis. Traffic throttle, rate shaping and session layer control are also handled in one example. Other controls possible with the illustrated communication portion 38 include internet protocol address related triggers, jurisdiction data access dependent triggers and jurisdiction application access dependent triggers.

Other control functions are possible with a communication portion 38 designed according to an embodiment of this invention. Appropriate PUSH capabilities, PULL capabilities or both are provided to an example communication portion 38 in a known manner to facilitate interfacing with appropriate elements of the wireless communication network to provide the desired wireless communication service to a particular individual according to information from the database portion 36.

The control portions 40 allow each public service agency to configure information in the database portion 36 to achieve a desired level of service on behalf of its employees, for example. Each agency is able to use its control portion 40 to customize how wireless communication services are to be provided to its employees or subscribers.

In one example, each agency that has management control over one of the RANs may specify how a visiting user (e.g., an individual subscriber from a public service agency of another jurisdiction) is granted or denied access to wireless communications through the equipment managed by that agency. Additionally, each agency is able to specify whether its individual subscribers are to be provided with visiting subscriber access when that individual is outside of the region covered by the wireless communication equipment managed by its jurisdiction.

In one example, the control portions 40 allow authorized individuals at each corresponding agency to obtain real time information regarding wireless communications by individual subscribers associated with that agency. For example, the database portion 36 may receive information from a mobile station regarding global positioning information, time of usage, applications accessed and other types of information indicating use of the wireless communication system by each individual. Such real time information may be updated on a periodic or continuous basis, depending on the needs of a particular agency. The database portion 36 includes the ability to automatically read and write such information and to store it according to the needs of a particular situation. Given this description, those skilled in the art will be able to configure a control portion 40 and a database portion 36 to meet the needs of a particular public service agency using such an arrangement.

Real time information within the database portion 36 includes real time profile information regarding events, alarms, handoff triggers, RF parameter measurements, IP address and application access. Additionally, information regarding changes in quality of service profiles and security functions may populate the database in a real time environment.

In one example, maintaining the real time information is accomplished by having the communication portion 38 interrogate various network elements on a real time basis and creating PULL applications to query appropriate network elements such as IP Core Network elements or radio access network elements.

In one example, each mobile station has a client running on the mobile station device that provides location information such as global positioning system information. This creates PUSH applications that are used for updating relevant fields within the database portion 36 on a real time basis. The PUSH and PULL applications allow for simultaneous read and write operations within the database portion 36 to facilitate providing real time information to the control portions 40 so that the real time information is accessible in a user-friendly manner.

Having such real time information mapped into the database portion 36 provides the corresponding agency the ability to modify, teardown or reinitialize subscriber activity based on priority, coverage, application, data rate, quality of service or any other public agency requirement.

The control portions 40 and the device 34 allow an appropriate individual from each jurisdiction or agency to manage its own virtual network and all users within its boundary in a remote and discrete manner.

One advantage of the disclosed arrangement is that the device 34 can be configured as a stand alone device that does not require any significant changes to standard-driven radio access network or core network elements. A solution that includes a device 34 like the disclosed example is, therefore, easily accessible by a wide variety of public service agencies. Additionally, the example device 34 can be used for facilitating wireless communications on behalf of any number of public service agencies in a plurality of jurisdictions, depending on the needs of a particular situation. Given this description, those skilled in the art will be able to configure the various portions of an example device 34 to meet the needs of their particular situation, for example, to provide sufficient capabilities to provide services to the number of subscribers involved.

One advantage to the disclosed example is that various portions of the device 34 may be imported onto known operating software based systems, which keeps the cost of development of software algorithms and a data base engine within a manageable level. This renders an approach that includes the example device 34 an economical solution for facilitating wireless communications on behalf of public service agencies.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for facilitating wireless communications on behalf of at least one public service agency, comprising
    a database portion including information regarding how at least one wireless communication network element is to operate on behalf of a user from the at least one public service agency;
    a communication portion configured to interface with the at least one wireless communication network element to provide information from the database portion to the at least one wireless communication network element for controlling how the at least one wireless communication network element operates to provide wireless communications for the user according to the provided information, the at least one wireless communication network element having different modes of operation responsive to the information provided by the communication portion, a first one of the modes of operation being for a user from the at least one public service agency, a second different one of the modes of operation being for a user outside of the at least one public service agency; and
    a control portion configured to allow the at least one public service agency to configure information in the database portion corresponding to the users from the at least one public service agency.

2. The device of claim 1, wherein the database portion includes real time information regarding use of the wireless communication network by the user.

3. The device of claim 2, wherein the communication portion is configured to gather information from the at least one wireless communication network element indicative of the real time information and wherein the database portion receives the gathered information from the communication portion and automatically includes the corresponding real time information in the database portion.

4. The device of claim 1, wherein the at least one wireless communication network element comprises at least one radio access network element and at least the first mode of operation comprises at least one of:
    base station handover control for a user;
    radio access network handover control for a user;
    jurisdictional limits on wireless communication coverage for a user; and
    data rate control.

5. The device of claim 1, wherein the at least one wireless communication network element comprises a core network element and at least the first mode of operation comprises at least one of
    gateway handover control for a user;
    session layer control;
    traffic throttle control;
    rate shaping control; and
    jurisdictional access control.

6. The device of claim 1, wherein the at least one public service agency comprises at least one of a police department, a fire department, an emergency medical service provider, a road commission or a department of public works.

7. The device of claim 1, comprising
    a plurality of control portions, each dedicated to a corresponding public service agency, each of the control portions is configured to allow the corresponding public service agency to control information in the database portion corresponding to a user from the corresponding public service agency.

8. The device of claim 7, wherein the database portion includes a plurality of sets of information, each set corresponding to one of the public service agencies.

9. The device of claim 7, wherein at least two of the public service agencies are responsible for services in geographically distinct areas and wherein the database portion includes information regarding wireless communication access privileges for a user from one of the two public service agencies when the user is within the area of the other of the two public service agencies.

10. The device of claim 1, wherein the communication portion is configured to cause an alteration of at least one feature of the at least one wireless communication network element.

11. A method of facilitating wireless communications on behalf of at least one public service agency, comprising the steps of:
    including information in a database regarding how at least one wireless communication network element is to operate on behalf of a user from the at least one public service agency;
    allowing the at least one public service agency to configure information in the database corresponding to users from the at least one public service agency; and
    communicating with at the at least one wireless communication network element to provide information from the database to the at least one wireless communication network element for controlling how the at least one wireless communication network element operates to provide wireless communications for the user according to the provided information, the at least one wireless communication network element having different modes of operation responsive to the information provided by the communication portion, a first one of the modes of operation being for a user from the at least one public service agency, a second different one of the modes of operation being for a user outside of the at least one public service agency.

12. The method of claim 11, comprising
    including real time information regarding use of the wireless communication network by the user in the database.

13. The method of claim 12, comprising
    gathering information from the at least one wireless communication network element indicative of the real time information; and
    automatically including the real time information in the database.

14. The method of claim 11, wherein
    the at least one wireless communication network element comprises at least one radio access network element; and
    at least the first mode of operation comprises at least one of:

base station handover control for a user;
radio access network handover control for a user;
jurisdictional limits on wireless communication coverage for a user; and
data rate control.

15. The method of claim 11, wherein
the at least one wireless communication network element comprises a core network element; and
at least the first mode of operation comprises at least one of:
gateway handover control for a user;
session layer control;
traffic throttle control;
rate shaping control; and
jurisdictional access control.

16. The method of claim 11, wherein the at least one public service agency comprises at least one of a police department, a fire department, an emergency medical service provider, a road commission or a department of public works.

17. The method of claim 11, comprising
allowing each of a plurality of public service agencies to control information in the database corresponding to a user from the corresponding public service agency.

18. The method of claim 17, comprising
including a plurality of sets of information in the database, each set corresponding to one of the public service agencies.

19. The method of claim 17, wherein at least two of the public service agencies are responsible for services in geographically distinct areas and comprising
including information in the database regarding wireless communication access privileges for a user from one of the two public service agencies when the user is within the area of the other of the two public service agencies.

20. The method of claim 11, comprising
automatically altering at least one feature of the at least one wireless communication network element responsive to information communicated to the at least one wireless communication network element.

21. A method of facilitating wireless communications on behalf of at least one public service agency, comprising the steps of:
including information in a database regarding how at least one wireless communication network element is to operate on behalf of a user from the at least one public service agency;
allowing the at least one public service agency to configure information in the database corresponding to users from the at least one public service agency;
communicating with at the at least one wireless communication network element to provide information from the database to the at least one wireless communication network element for controlling wireless communications by the user according to the provided information;
allowing each of a plurality of public service agencies to control information in the database corresponding to a user from the corresponding public service agency, wherein at least two of the public service agencies are responsible for services in geographically distinct areas; and
including information in the database regarding wireless communication access privileges for a user from one of the two public service agencies when the user is within the area of the other of the two public service agencies.

22. A device for facilitating wireless communications on behalf of at least one public service agency, comprising
a database portion including information regarding how at least one wireless communication network element is to operate on behalf of a user from the at least one public service agency;
a communication portion configured to interface with the at least one wireless communication network element to provide information from the database portion to the at least one wireless communication network element for controlling wireless communications by the user according to the provided information; and
a plurality of control portions, each dedicated to a corresponding public service agency, each of the control portions is configured to allow the corresponding public service agency to control information in the database portion corresponding to a user from the corresponding public service agency,
wherein at least two of the public service agencies are responsible for services in geographically distinct areas and wherein the database portion includes information regarding wireless communication access privileges for a user from one of the two public service agencies when the user is within the area of the other of the two public service agencies.

* * * * *